Patented May 3, 1927.

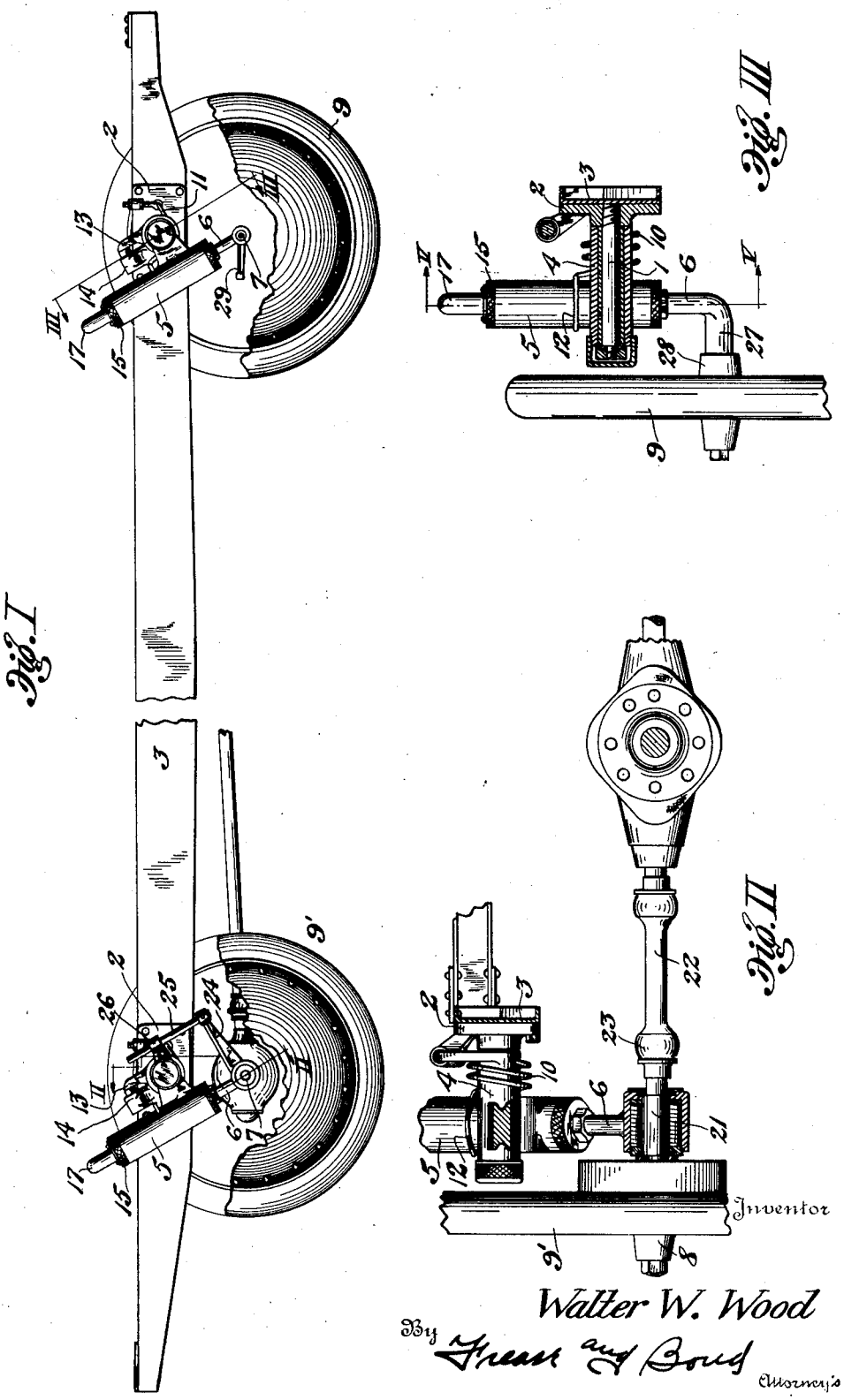

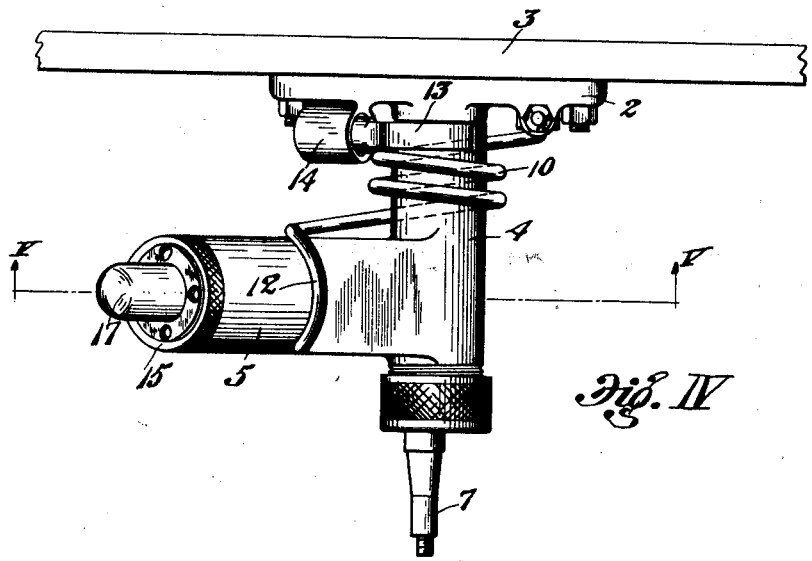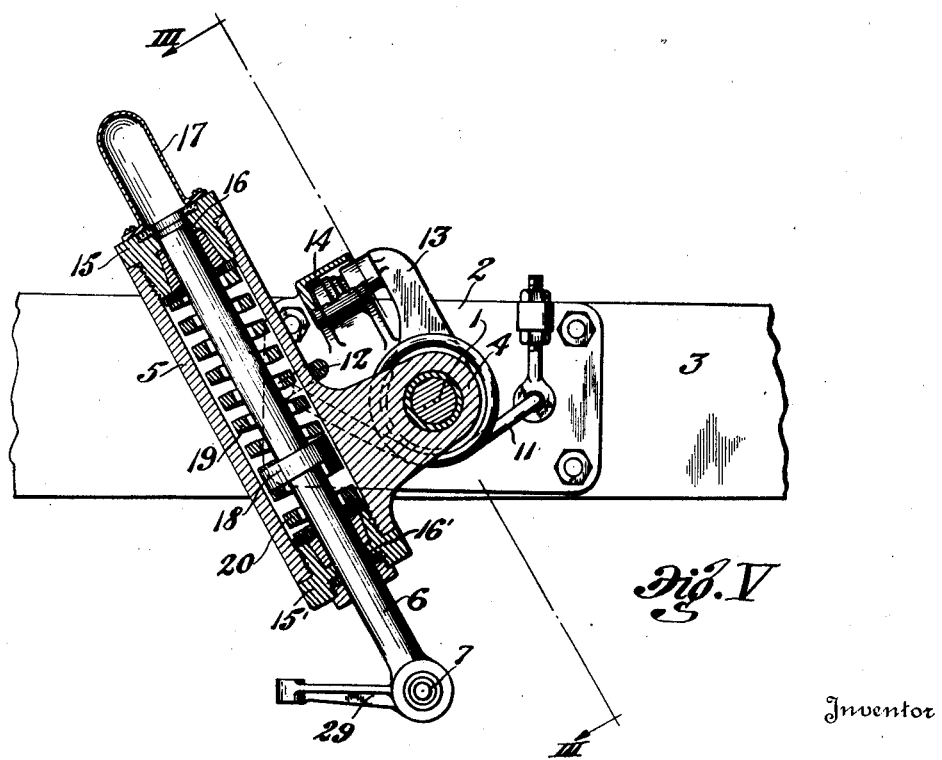

1,626,996

UNITED STATES PATENT OFFICE.

WALTER W. WOOD, OF CANTON, OHIO.

VEHICLE SPRING.

Application filed June 7, 1922. Serial No. 566,556.

The invention relates to supporting springs for automobiles and other vehicles; and the object of the improvement is to provide spring means between the wheels and the chassis of a vehicle, which will permit or cause the chassis to travel in a plane substantially parallel to the general plane of the road while the wheels are surmounting or riding over protrusions or depressions in the road.

Ordinary vehicle springs usually permit, more or less freely, a vertical movement of the chassis with reference to the wheels, without permitting any considerable longitudinal movement between the same parts; and such springs have frequently been supplemented by various kinds of shock absorbers, many of which permit a vertical, without much, if any horizontal movement, of the chassis upon the wheel.

It has also been proposed, if not generally practiced, to provide for a spring controlled movement between the chassis and the wheels, directly longitudinal of the chassis, so as to permit the wheels to temporarily pause or lag when meeting an obstacle, without much, if any, effect upon the momentum or forward movement of the chassis.

Each of these different forms of springs serve a particular and useful purpose, but none of them used separately or combined, to my knowledge, serve to minimize the vertical movement of the chassis with reference to the wheels, or cause the same to move parallel to the general plane of the road, which is the result attained by the means set forth herein.

The present improvement involves the use of spring slide and guide means extending upward and rearward from the wheel spindles, and preferably located in rear of torsion springs, pivotally connected with trunnion spindles located above the wheel spindles; so that the initial impact of an obstacle, tending to cause the wheel to stop or lag, will tend to cause the chassis to move downward upon the inclined slide guide because of its forward momentum, and thereby neutralize or absorb the effect of the upward movement of the wheel as it rises to surmount the obstacle, either directly upward when the vehicle is traveling slowly, or by lagging behind the trunnion spindles when the vehicle is traveling rapidly.
In other words, an important purpose of the invention is to provide practical and effective spring means, so designed that when the wheel encounters an obstacle, the mechanical couple or moment formed by the momentum of the car on the one hand and the horizontal component of the reaction of the obstacle on the other hand automatically counteracts or neutralizes the upward thrust delivered to the frame by the wheel as the latter rises over obstacles, inasmuch as this moment exerts a downward force on the frame, if the construction is such as to permit it.

The improvement also involves the use of a trunnion connection for the wheel spindle with the chassis, normally located directly above the wheel spindle, and controlled by a torsion spring, so that the torsion spring will normally carry little, if any, of the weight of the load, but will carry more of the load as the wheel lags, without however, materially reducing the vertical distance between the two spindles; the rising of the wheel to surmount an obstacle without elevating the chassis, being primarily or principally permitted by inclined spring-controlled guide and slide means.

In other words, when an obstacle is encountered, the major portion of the rising of the wheel is permitted by a compression of the inclined guide spring, and the major part of the lagging of the wheel is permitted by a twisting or tightening of the trunnion torsion spring; so that when the wheel has passed the obstacle, both springs exert their maximum force to recover the wheel to normal position.

Thus, when the wheel of a forwardly moving vehicle impinges on an obstacle, the wheel may lag while it is surmounting the obstacle by a compression of the slide spring and if the obstacle is high enough a further rising of the wheel will be accommodated by a twisting of the trunnion spring, both actions being accomplished without any rising of the chassis; and after the wheel has ridden over the obstacle the combined action of the compression and torsion springs immediately thrusts the wheel downward to regain its contact with the road without hav ing impeded the forward movement of the chassis or having materially raised or lowered the same.

An embodiment of the invention is illustrated in the accompanying drawings, wherein—

Figure I is a side elevation of the frame or chassis and wheels of a vehicle showing the improved spring supporting means for the chassis;

Fig. II, a fragmentary section on line II—II, Fig. I, showing the application of the improvement to a driving wheel;

Fig. III, a section on line III—III, Figs. I and V, showing the application of the improvement to a steering wheel;

Fig. IV, a plan view of the spring means for a steering wheel; and

Fig. V, a section on line V—V, Figs. III and IV, with the wheel removed, showing an end view of the wheel spindle.

Similar numerals refer to similar parts, throughout the drawings.

Trunnions 1 are secured by brackets 2 or other suitable means to the side of the frame or chassis 3 of a vehicle, and upon the trunnions are transverse bearings 4 formed or secured on the forward side of tubular bearings 5 in which are slidably mounted piston rods 6 having L-spindles 7 on the lower ends for the hub 8 of a steering wheel 9, or the nut 8' of a driving wheel 9'.

A torsion spring 10 is coiled freely around the transverse bearing having one end 11 adjustably connected to the bracket 2 and the other end 12 extended upward in rear of the bearing and thence outward around the forward side of the cylindric bearing, so as to restrain a clockwise turning and impel an anti-clockwise turning of the transverse bearing on the trunnion as viewed from the right side of the vehicle.

A stop arm 13 is provided on each transverse bearing and a stop bracket 14 is provided on each bracket in which is mounted a stop spring for cushioning and stopping the anti-clockwise turning of a right side bearing when the axis of the wheel spindle is directly below the axis of the trunnion.

Each tubular bearing 5 is provided with heads 15 and 15' forming journal bearings 16 and 16' in which the piston rods 6 are adapted to slide endwise and to rotate, and a tubular shield is preferably provided on the upper head 17 for enclosing the upper end of the piston rod.

A piston 18 is secured to the piston rod within the tubular bearing and a spiral compression spring 19 is located between the piston and the upper head of the bearing; which spring is strong enough to normally support the portion of the load of the vehicle imposed upon it, while yielding to the unusual shock caused by the wheel riding over an obstacle. A coiled compression spring 20 may also be provided between the piston 18 and the lower head of the tubular bearing to cushion an upward movement of the chassis or a downward reaction of the wheel.

For a rear or driving wheel 9', the lower end of the piston rod 6 is provided with a bearing for a drive axle 21, the inner end of which is connected to a drive shaft 22 by a flexible joint 23, on the outer end of which is mounted a drive wheel 9'. The lower end of the same piston rod is provided with a forwardly extending arm 24 having a guide rod 25 extending upward in front of and parallel with the tubular guide and operating in a guide 26 provided on the forward side of the transverse bearing; which slide rod and guide serves to hold the piston rod from turning in its bearing.

For a forward or steering wheel the lower end of the piston rod is formed with an L-arm 27 terminating in a spindle 7 upon which is journaled the hub 8 of the forward wheel 9; and the lower end of the same piston rod is provided with a rearwardly extending crank arm 29 connected with a steering rod, not shown, by means of which the piston rod 6 may be rotated for steering the vehicle.

The torsion spring 10 and the compression spring 19 may be and preferably are each strong enough to sustain that portion of the weight and the load of the car which is imposed upon the corresponding wheel. As the axis of the wheel is normally located immediately below the axis of the trunnion, the torsion spring does not normally carry any portion of the load until the wheel lags rearward with respect to the trunnion; but the compression spring is always supporting a major part of the load, and for that reason it responds to the initial shock of an obstacle and permits the wheel to rise until a turning of the transverse bearing upon the trunnion brings the torsion spring into play.

All of these actions and reactions occur without any material restraint to the forward movement of the vehicle, the momentum of which carries it forward parallel with the road while the combined yielding action of the compression and torsion springs permit the wheel to rise to pass over an obstacle and to recover contact with the road without materially affecting the even travel of the vehicle. This is due to the construction which permits the horizontal component of the reaction from the obstacle to impress, set up, or be translated into a turning movement on the mass-center affected. This movement results in a downward pull on the vehicle frame which tends to neutralize the upward thrust which the vehicle frame simultaneously receives from the vertical component of the reaction.

Each tubular and transverse bearing thus constitute a rocking member journaled on a trunnion, and the compression or primary spring permits an upward movement of a wheel independent of the torsion spring and the torsion spring permits a rearward movement independent of the compression spring; and the action of the secondary torsion spring gives the primary compression spring time within which to function when a vehicle is traveling at faster speeds.

When a wheel rides into a depression, the first action is an expansion of the compression spring which tends to move the wheel downward and forward more quickly than the vehicle subsides, until the wheel strikes the bottom or the further side of the depression; whereupon the springs operate substantially as described where a wheel meets an obstacle, and the vehicle gradually rises to its normal height from the roadway, without rebounding above the same.

I claim:

1. A vehicle spring support including a spring controlled rocking member having a guideway therein normally inclined downward and forward, and a spring controlled spindle stem slidable endwise in the guideway and rotatable therein.

2. A vehicle spring support including a spring controlled rocking member having an upright guideway therein in rear of its axis, and a spring controlled spindle stem slidable endwise in the guideway and rotatable therein, the axis of rocking being different from the axis of the guideway.

3. A vehicle spring support including a spring controlled rocking member having an upright guideway therein in rear of its axis normally inclined downward and forward, and a spring controlled spindle stem slidable endwise in the guideway and rotatable therein.

4. A vehicle spring support including a spring controlled rocking member having an upright guide-way therein, and a screen controlled spindle stem slidable endwise in the guideway and rotatable therein, the axis of rocking being different from the axis of the guideway.

5. A vehicle spring support, including a rocking member having a guideway therein normally inclined downward and forward, a torsion spring controlling the rocking member, a spindle stem slidable endwise in the guideway, and a compression spring controlling the spindle stem.

6. A vehicle spring support including a spring controlled rocking member having a normally inclined guideway therein normally inclined downward and forward, a spindle normally located directly below the axis of the rocking member, and a spring controlled stem on the spindle slidable endwise in the guideway.

7. A vehicle spring support including a spring controlled rocking member having a normally inclined guideway therein normally inclined downward and forward, a spring controlled stem slidable endwise in the guideway, a spindle on the stem, means for normally stopping rotation of the rocking member one way.

8. A vehicle spring support including a trunnion on the vehicle, a wheel spindle normally parallel to the trunnion, and connecting means permitting the spindle to move upward in rear of the trunnion also to gyrate upon the same and also to swing from parallel therewith, the three movements being operable independently of each other.

9. A vehicle spring support including a normally active compression spring and a normally inactive torsion spring brought into action after a yielding of the normally active spring, the actions of the springs being in different directions.

10. A vehicle spring support including a normally active spring, and a normally inactive spring brought into action after a yielding of the normally active spring, the actions of the springs being in different directions.

WALTER W. WOOD.